June 30, 1931.  D. C. PAGE ET AL  1,812,017
CHUCK
Filed March 12, 1927  2 Sheets-Sheet 1
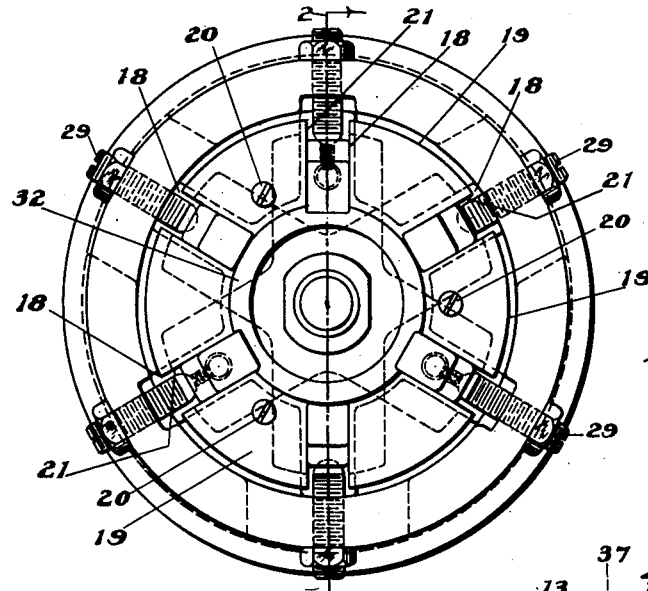
Fig.1
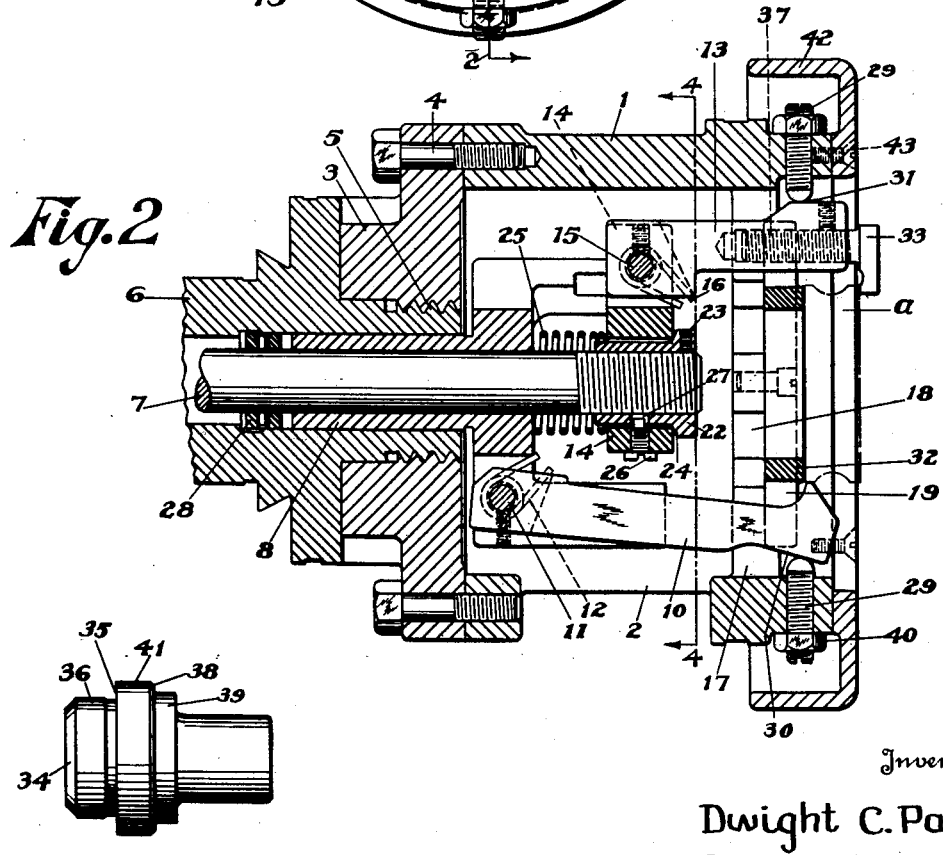
Fig.2
Fig.5
Inventors
Dwight C. Page
Richard H. Jellicoe
Geo. W. Kennedy Jr.
Attorney June 30, 1931.　　　D. C. PAGE ET AL　　　1,812,017

CHUCK

Filed March 12, 1927　　　2 Sheets-Sheet 2

Inventors
Dwight C. Page
Richard H. Jellicoe
By Geo. H. Kennedy Jr.
Attorney

Patented June 30, 1931

1,812,017

UNITED STATES PATENT OFFICE

DWIGHT C. PAGE AND RICHARD H. JELLICOE, OF WORCESTER, MASSACHUSETTS, ASSIGNORS TO THE HEALD MACHINE COMPANY, OF WORCESTER, MASSACHUSETTS, A CORPORATION OF MASSACHUSETTS

CHUCK

Application filed March 12, 1927. Serial No. 174,940.

The present invention relates to improvements in work holding devices or chucks,— more especially those adapted to hold annular or hollow workpieces in position to be operated upon interiorly by a tool, grinding wheel, or the like.

The invention is particularly applicable to the chucking of annular or hollow workpieces, whose exterior cylindrical or partly cylindrical surfaces are already turned or ground to true circles; according to the invention, each such workpiece successively presented to the chuck is automatically centered with reference to its external surface, and held in such position, so that when the bore of the workpiece is cut or ground to the desired diameter, it will be concentric with the exterior surface.

The invention, as hereinafter more fully described, provides two sets or series of work engaging fingers, namely, a set or series of centering fingers which are spring pressed against the external surface of each successive workpiece, and a set or series of work holding fingers which, after the workpiece has been centered, move into pressing engagement with one plane end surface of said workpiece, thereby to clamp the latter against an unyielding plane surface of the chuck. When a workpiece is so clamped, its entire interior surface or bore can be operated upon, without obstruction, by a tool, grinding wheel or the like, and since the clamping force is exerted endwise, there is no radial distortion of the workpiece, nor any damage to the cylindrical outer surface thereof, such as might be occasioned by clamping jaws engaging said cylindrical outer surface.

According to the invention, the centering fingers are pressed against the cylindrical outer surface of the workpiece with only a slight resilient force, and the holding fingers engage one of the plane end surfaces as above set forth; thus even comparatively thin walled work will not be distorted. The attainment of the above and other objects of the invention will be more clearly set forth hereinafter, with reference to the accompanying drawings, in which—

Fig. 1 is a view in front elevation of the work holding device or chuck of my invention.

Fig. 2 is a sectional view on the line 2—2 of Fig. 1, showing the chuck in closed position.

Fig. 5 is an elevation of a dummy used for adjusting the chuck to a particular size of workpiece.

Like reference characters refer to like parts in the different figures.

Figure 4:
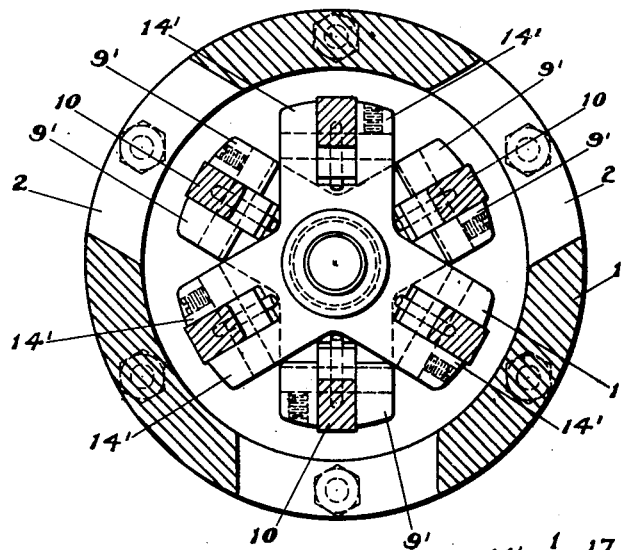
Fig. 4 is a sectional view on the line 4—4 of Fig. 2.

Referring first to Figs. 1 to 4 inclusive, the two sets of work engaging fingers, together with their operating devices, as hereinafter described, are preferably inclosed in a substantially cylindrical shell or casing 1, portions of said shell or casing being cut away at 2 in order to render the mechanism inside easily accessible. Said shell 1 is fastened at its inner end to a plate 3 by means of bolts 4; said plate 3 in turn is secured in any suitable way, as by the screw threads 5, to the end of a suitably journalled work rotating spindle or shaft 6, here shown as made hollow for the longitudinal movement therein of a rod 7 adapted, when moved to the right, to open the chuck, and when moved to the left, to close it. The construction, arrangement and operation of the parts which are operated by said rod 7 will now be set forth in detail.

Slidably received in the bore of the shaft 6 is a sleeve 8, whose front end, within the space inclosed by the shell 1, provides a spider or enlargement 9 having three pairs of radially and forwardly projecting ears 9', 9' for the pivotal attachment of equally spaced work centering fingers 10, 10, 10, whose pivot pins 11 are journalled in said ears. The fingers 10, 10, 10 are forked where the pivot pins 11 pass through them, and short coil springs 12 surround the pins 11, one end of said springs bearing against the enlargement 9, and the other end bearing against the fingers 10 inside the forked portions. This tends to spread or distend said fingers. The other set of fingers of the chuck, namely the work clamping fingers 13, 13, 13 are carried by a member 14 having three pairs of ears 14', 14', said fingers being pivotally mounted, as in the case of fingers 10, on pivot pins 15 passing through said ears 14', 14', and springs 16, similar to the springs 12, being provided to press the fingers 13 outwardly.

For the alinement and longitudinal guidance of all the fingers, the casing 1 provides a front portion 17, preferably integral therewith, with slots 18 (see Fig. 1) for the passage of the said fingers. An annular plate or member 19 is suitably attached, as by screws 20, to this front portion 17, as best shown in Fig. 1. The member 19 provides slots 21 which actually contact the fingers and hold them in alinement. The fingers 10, which must always be very accurately positioned in order to properly center a workpiece, are also guided by the forward projections of the ears 9', 9'. Preferably, as shown, the fingers 10 and 13 are spaced in alternating relation, sixty degrees apart, the important point in this connection being that the centering fingers 10 should be equally spaced with respect to each other.

Figure 3:
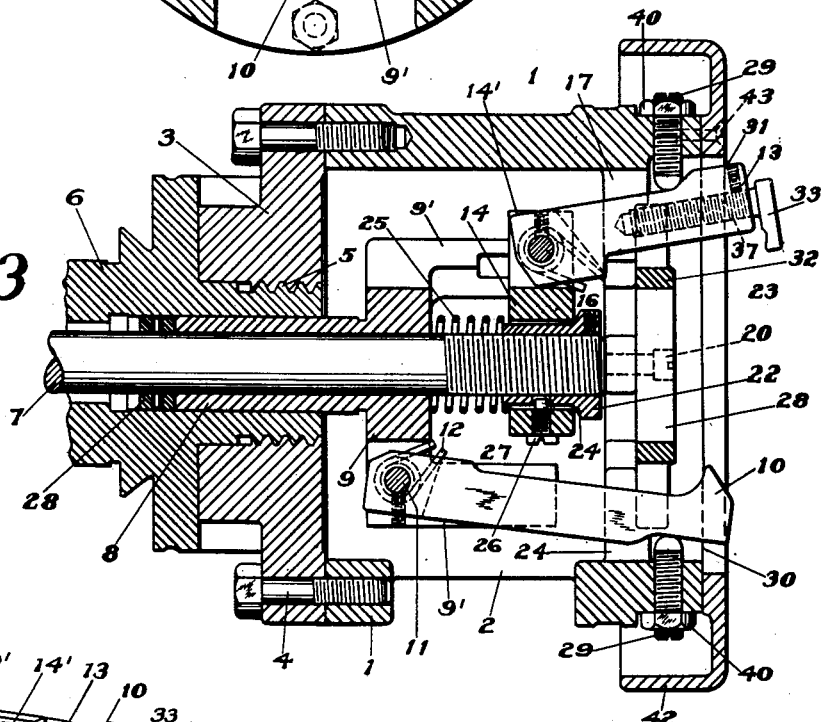
Fig. 3 is a view similar to Fig. 2, showing the chuck in open position.

A collar 22 is internally threaded and screwed onto the front end, also threaded, of rod 7, said collar being fixed in position on said rod, preferably by means of a set screw 23. Said collar 22 serves as the mounting for member 14, the latter being apertured to loosely receive said collar, with an appreciable clearance, as shown in Figs. 2 and 3, between the opposing surfaces of collar and member. The member 14 is thrust forwardly on collar 22, against a bevelled shoulder 24 of said collar, by means of a spring 25, the other end of which bears against the spider or enlargement 9. For retaining the member 14 on collar 22, a set screw 26 carried by member 14, has its inner end received in a hole 27 of the collar; however, said hole 27 is considerably larger than the nose or end of the set screw 26, so that the freedom of member 14 to tip or move to a limited degree on the collar 22 is not interfered with. This loose mounting of member 14 on collar 22, by which limited movement of said member in any direction is permitted, gives said member the capacity to adjust itself to varying conditions which affect its clamping fingers 13, 13, whereby to equalize the pull which it exerts on said fingers, as hereinafter described. The rod 7 also carries a second collar 28, fastened thereto in any suitable manner, which limits left hand movement of sleeve 8 under the influence of spring 25.

When the chuck is in open position, as shown in Fig. 3, (the rod 7 being thrust to the right) the sleeve 8 is held in its extreme right hand position, by reason of the collar 28. The member 14 is likewise held in its extreme right hand position, since the collar 22 which carries it is rigidly attached to the rod 7, and under these conditions, the fingers 10, 10, 10 and 13, 13, 13 are not only not operative, but are pressed into extreme distended position, by reason of the several springs 12 and 16. The several fingers are, however, engaged by a plurality of set screws 29 by means of which the operative adjustment of the fingers is effected, said screws 29, six in number in this embodiment of the invention, engaging with cam surfaces 30 in the case of fingers 10, and the cam surfaces 31 in the case of fingers 13.

The slotted plate or member 19 provides an annular front flange 32, adapted to form a backing for the inner plane surface of a workpiece a (see Fig. 2), and to receive the thrust of clamps 33, adjustably carried by the fingers 13, when said clamps are drawn into engagement with the outer plane surface of said workpiece. It will be understood that the equipment of the chuck includes a number of interchangeable members 19, presenting front flanges 32 of different diameters, suitable for workpieces a of a variety of sizes, and that in setting up the chuck to receive and hold successive workpieces a of any given size, the chuck will be equipped with that member 19 whose front flange 32 is of the correct size to provide a backing for the workpiece, without interfering with the inward travel of the grinding wheel or other cutting tool through the bore of the workpiece.

In order to properly adjust the screws 29 so that the fingers 10 will first center a workpiece, and the fingers 13 will thereafter firmly clamp it, a dummy 34, as illustrated in Fig. 5, may be used,—it being understood that a variety of sizes of dummies 34, corresponding to different sizes of workpieces, will be provided, using in the chuck the proper member 19, and the dummy 34 of the correct size for the workpiece a to be ground, said dummy 34 is pushed into the annular flange 32 until a shoulder 35 on the dummy is in contact with the front of the said flange, it being understood that the cylindrical portion 36 of the dummy fits snugly inside the annular flange 32. The rod 7 is now moved to the left, and the jaws 33, which have screw threaded shanks 37, are adjusted inwardly or outwardly of fingers 13 until, the rod 7 being in its extreme left hand position, the jaws 33 engage a shoulder 38 on the dummy. The three screws 29 that control the action of fingers 13 are now turned till the ends of the jaws contact a cylindrical portion 39 on the dummy, whereupon nuts 40 are tightened to hold this adjustment of these particular screws 29.

The operating rod 7 of the chuck is adapted to be moved by means of a lever, or equivalent device, not shown, in the usual manner and, as is also usual, the rod is forced to the left through the action of a powerful spring (not shown) which either opposes the movement of said lever or, preferably, is interposed between it and the rod.

On account of the adjustment so far described, the jaws 33 of the work holding fingers will firmly hold the workpiece which is to be inserted in the chuck, since the cylindrical portion 41 of the dummy, between the shoulders 35 and 38, is slightly shorter than the length of the workpiece a to be operated upon; this fact allowing the strong spring to hold the workpiece. Also the jaws 33 are set to the proper radial position by the portion 39 of the dummy. To set the work centering fingers 10, the rod 7 is moved slightly to the right, by means of the lever referred to, and any one of the three fingers 10 is caused to contact the surface 41 of the dummy by tightening the proper set screw 29. The other two set screws may now be turned till they also contact the portion 41, since the sleeve 8 is held in position as soon as any one of the said screws contacts the dummy. When the points of all the fingers 10 just touch the said portion 41 of the dummy, the check nuts 40 are tightened on the screws 29 that caused this adjustment, the dummy is removed, and the chuck is now ready for this particular size of workpiece.

To load the chuck, the operator first moves the rod 7 to the right to open all the chuck fingers, as shown in Fig. 3. Holding an unfinished workpiece on his (the operator's) fingers, he presents it to the chuck, and with his other hand moves the aforesaid lever to carry the rod 7 to the left again. This operation only takes an instant of time, and the new workpiece is centered and firmly held, but tracing the action of the several fingers, it will be seen that, as the rod moves and the fingers all approach the workpiece, the fingers 10 will touch it first, for the reason that they were set when the rod was farther to the right than it was when the fingers 13 were set. The fingers 10 approach the axis of the chuck together, being always equidistant therefrom, owing to the camming action of the screws 29 on the surfaces 30. Since the tips of fingers 10 were set to define a circle concentric with the axis of the chuck, they force the outside circumference of the workpiece to assume a similar position.

It is obvious that once the fingers 10 have contacted and centered the workpiece a, as shown in Fig. 2, they can move no further inward, and, owing to the incline of the cam surfaces 30, they cannot be drawn to the left any further either. Consequently the sleeve 8 is held from further movement, but the rod 7 continues to move, for the strong spring mentioned is much stronger than the spring 25, said spring 25 undergoing compression as the jaws 33 move into engagement with the plane end surface of the work.

Upon completion of the operation on the bore of the workpiece a to bring it to the desired finished size, the rod 7 is moved to the right, in consequence of which first the jaws 33, and subsequently, the fingers 10, move outwardly and release the workpiece. Thereafter, each successive workpiece to be operated upon is inserted in the above described manner.

Desirably, a guard 42 is provided in order that the set screws 29 may not cut the operator's hand as the chuck revolves. Said guard may be conveniently attached and detached, as by the use of countersunk screws 43.

Figure 6:
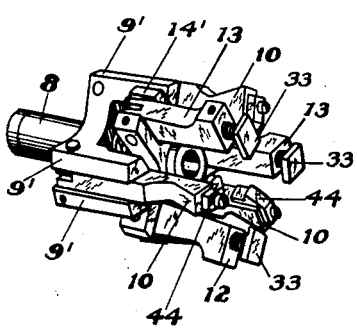
Fig. 6 is an isometric view, on a small scale, of the two sets or series of chuck fingers.

Other ways of setting up the chuck will occur to those skilled in this art,—among these might be mentioned the use of a gauge indicator on an already accurately finished workpiece,—the use of the dummy 34 being described only by way of illustration. As shown in Fig. 6, the fingers 10 may have detachable centering pieces 44, in order that the chuck may accommodate a more varied range of workpiece sizes without requiring the fingers 10 themselves to be changed.

The three centering fingers 10 are resiliently urged toward the center, and are always maintained at equal distances therefrom; as three points determine the circle, it follows that the workpiece, when engaged by said fingers, will be correctly centered. The three clamping fingers 13, which are drawn inwardly to engage the thus-centered workpiece, are carried by the member 14, whose mounting on the collar 22, as previously described, is, to a limited degree a universal mounting, permitting the member 14 to accommodate itself to non-uniform adjustments of the clamps 33, or to surface inequalities of the workpiece a,—the effect in either case being to equalize, substantially, the pull on all three clamping fingers. These and other features of our invention, as set forth in the appended claims, permit successive workpieces to be quickly chucked, in centered position, without the necessity for time-consuming adjustments, once the chuck has been set for a particular size of workpiece.

We claim,

1. In a chuck, an operating rod, a member attached to said rod, a set of work-clamping devices pivotally attached to said member to swing in radial planes, a second member mounted to slide in said chuck, a set of work-centering fingers pivotally attached to said second member and adapted to swing in radial planes, and resilient means urging said centering fingers together when said rod is drawn inwardly of said chuck.

2. In a chuck, an operating rod, a set of work-clamping devices attached to said rod, a member mounted to slide in said chuck, a set of work-centering fingers pivotally attached to said member and adapted to swing in radial planes, and resilient means urging said centering fingers together when said rod is drawn inwardly of said chuck.

3. In a chuck, an operating member mounted to slide axially in said chuck, a set of work clamping fingers operatively connected to said operating member, a set of work-centering fingers adapted, when moved as a unit to contact the exterior surface of a workpiece and center it, and a resilient connection between said operating member and said centering fingers, whereby the latter will first center the work, and the work clamping fingers may subsequently come into operation.

4. In a chuck, a plurality of work centering fingers, means to draw said fingers into the body of said chuck, means for causing the operative portion of said fingers to radially and equidistantly approach the axis of said chuck, and a plurality of fingers for gripping the workpiece after it is centered.

5. In a chuck, a plurality of work centering fingers, means to draw said fingers into the body of said chuck, means for causing the operative portion of said fingers to radially and equidistantly approach the axis of said chuck, and means for gripping the workpiece after it is centered.

6. In a chuck, a plurality of work-centering fingers, supporting and actuating means for said plurality of work centering fingers, a plurality of work-holding fingers, supporting and actuating means for a plurality of work holding fingers, a member to move both of said means, and resilient means to allow said centering supporting means to come to a fixed position before the completion of movement of said work holding supporting means.

7. In a chuck, centering means movable inwardly to engage with the periphery of a workpiece, holding means engageable with the outer face of said workpiece, and common operating means for said centering and holding means adapted to simultaneously move them into operative position.

8. In a chuck, a pair of spiders, a plurality of work-centering fingers carried by one spider, a plurality of work-holding fingers carried by the other spider, resilient means tending to spread the work-centering fingers, resilient means tending to spread the work-holding fingers, cam means adapted to cause the centering fingers to be moved radially inward at always equal distances from their limits of outward movement when the spider holding them is moved axially in one direction in said chuck, and adjustable cam means adapted to cause the work-holding fingers to be moved radially inward at always equal distances when the spider holding them is moved in the same direction as said other spider.

9. In a chuck, a fixed abutment for engagement by the rear face of a workpiece, clamping means engageable with the front face of the workpiece, to hold the latter against said abutment, in position to be operated upon by a tool, and centering means, independent of said abutment and said clamping means, for engagement with the periphery of said workpiece, to hold the latter in centered position in said chuck before the work clamping means comes into operation, whereby a workpiece may be centered in position with a slight amount of pressure so as not to deform it and thereafter may be held by a greater pressure.

10. A chuck for centering and holding an annular workpiece, to permit of operations on the bore thereof, said chuck comprising a plurality of fingers overhanging said workpiece and adapted to clamp the same by engagement with the outer face thereof, and centering means to position said workpiece in the chuck, by engagement with its outer periphery, prior to the engagement of said workpiece by said clamping fingers.

11. In a chuck for holding an annular workpiece, to permit of operations on the bore thereof, means for centering the workpiece by engagement with its outer periphery, a set of clamping fingers engaging the outer face of the centered workpiece, and a centrally disposed actuating member common to said clamping fingers, said actuating member having a limited universal mounting, whereby to equalize its pull on said fingers, notwithstanding unevenness of the outer surface of the workpiece.

Dated March 7, 1927.
DWIGHT C. PAGE.
RICHARD H. JELLICOE.